E. N. SHAW.
OIL BURNER.
APPLICATION FILED FEB. 13, 1911.
1,008,866.
Patented Nov. 14, 1911.
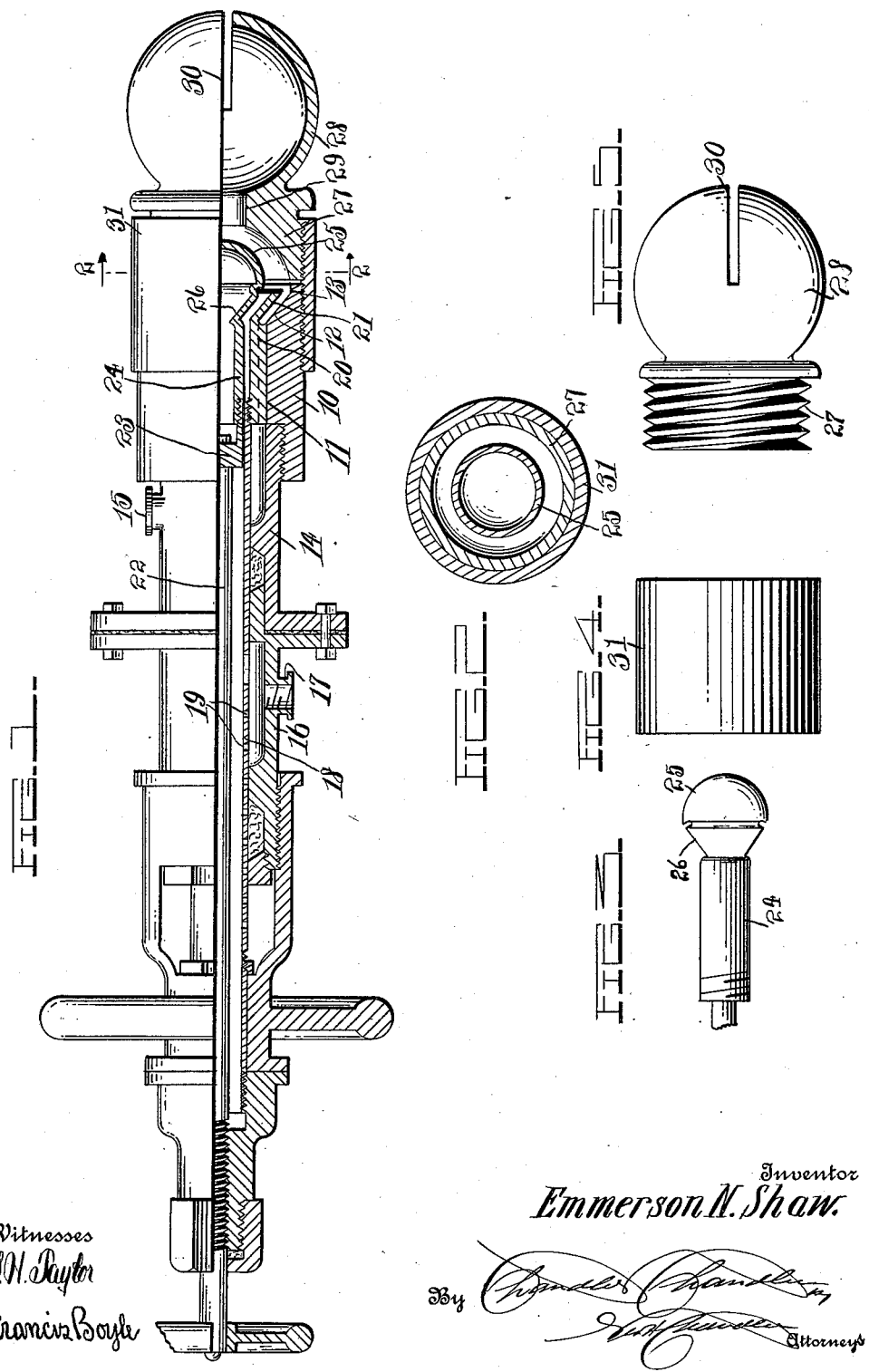
Inventor
Emmerson N. Shaw.
Witnesses

UNITED STATES PATENT OFFICE.

EMMERSON N. SHAW, OF SAN FRANCISCO, CALIFORNIA.

OIL-BURNER.

1,008,866.     Specification of Letters Patent.     Patented Nov. 14, 1911.

Application filed February 13, 1911. Serial No. 608,484.

*To all whom it may concern:*

Be it known that I, EMMERSON N. SHAW, a citizen of the United States, residing at San Francisco, in the county of San Francisco, State of California, have invented certain new and useful Improvements in Oil-Burners; and I do hereby declare the following to be a full, clear, and exact description of the invention, such as will enable others skilled in the art to which it appertains to make and use the same.

This invention relates to oil burners, more particularly to an improved nozzle for that class of oil burners described in Letters Patent issued to me on April 12, 1910 under Serial Number 954,652.

One object of the present invention is to provide a nozzle that will be adjustable so as to direct the flame to conform to various sized furnaces.

A further object of the present invention is to provide a mixing chamber within the nozzle, the mixing chamber being adjustable so that the composition and strength of the mixture may be varied to suit different conditions of service.

In the accompanying drawing forming part of this specification, Figure 1 is a side elevation of the burner with parts in section. Fig. 2 is a cross sectional view taken on the line 2—2 Fig. 1. Fig. 3 is a view in elevation of the valve. Fig. 4 is a side elevation of the connecting sleeve. Fig. 5 is a side elevation of the supplementary nozzle.

Referring now to the drawing numeral 10 designates a nozzle having an interior cylindrical bore 11, this bore being provided with a frusto-conical portion 12, which terminates in a spherical segment mouth 13, the latter coöperating with a nozzle hereinafter described to form a mixing chamber.

A steam connection 14 is threaded into the nozzle 10 and is provided with an inlet 15 adapted to be connected to a suitable steam supply. An oil connection 16 is secured to the steam connection and is provided with an inlet 17 which is designed to be connected to any suitable oil supply. Within the bores of the steam and oil connections is carried a perforated oil pipe 18, which communicates through a series of perforations 19 with the oil inlet. The steam connection is threaded into the nozzle 10. A reduced cylindrical longitudinally grooved head 20 is mounted in the bore of the nozzle and steam escapes through the grooves of this head into the mixing chamber. The head is provided with a frusto-conical free end portion 21, and when this portion is retracted into engagement with the frusto-conical portion or seat 12 in the nozzle, the steam supply is cut off entirely from the mixing chamber.

The parts above described are claimed in my former patent above referred to and form no part of the present invention, the present invention consisting rather in a novel valve for the oil supply, combined with a novel supplementary nozzle.

A stem 22 is carried within the bore of the oil pipe and is terminally equipped with a swivel nut 23, this swivel nut being fixed to a cylindrical valve 24, which terminates at its free end in a rounded head 25, the latter having a frusto-conical portion 26 similar to the steam valve, and which when the stem 22 is retracted bears upon this frusto-conical steam valve portion and cuts off the oil supply from the mixing chamber.

The supplementary nozzle consists of a cylindrical base portion 27 having a hemispherical-shaped bore, the walls of which confront and are uniformly spaced from the rounded head 25 of the oil valve, and form a continuation of the spherical segment nozzle mouth 13. The cylindrical base of the supplementary nozzle terminates in a hollow spherical knob 28, connection between the interior of the knob and base being made by a cylindrical axial duct 29 which confronts the center of the oil valve head. A slot 30 is formed in the knob in axial alinement with the duct, and extends approximately halfway around the knob. The supplementary nozzle base is externally threaded as is also the nozzle 10, and a connecting sleeve 31 is advanced on to the threaded portions of these members to fixedly join the members together.

In operation the steam inlet is connected to a suitable steam pipe and the oil inlet to a suitable oil pipe. Suppose that both the oil and steam valves are in the position shown in Fig. 1. The steam and oil entering through the valves will by virtue of the frusto-conical portions of the valves, be directed forcibly against the hemispherical inner wall of the supplementary nozzle, and will be deflected from this wall to the rounded head of the oil valve, and will then travel along this head and through the axial duct of the supplementary nozzle into the interior of the spherical knob where a thorough mixing of the oil and steam will take place before final ejection from the slot 30.

By virtue of the peculiar shape of the mixing chamber, a more thorough mixing of the oil and steam will take place than usual in devices of this character, and by virtue of the slot in the supplementary nozzle being arranged in axial alinement with the outlet duct 29 of the mixing chamber, a spray of great strength will be ejected through the nozzle, and this spray will be confined within such a small area as to be directed into a furnace in any desired manner to suit different conditions of service.

It will further be noted that by retracting the oil valve stem, the head of the oil valve will be moved away from the inner opposing wall of the supplementary nozzle and a greater sized mixing chamber presented between these confronting walls. The oil supply during this operation will be reduced, thus varying the composition of the mixture in the mixing chamber simultaneously with the enlargement of the chamber so that a thorough mixing of the fluids will be promoted.

What is claimed, is:—

1. The combination with an oil burner, having a valve seat, and a steam valve engageable with said seat, of an oil valve within said steam valve having a portion engageable with said steam valve, and having a rounded head in advance of said portion, and a nozzle having a bore spaced from and shaped to conform to the oil valve head, and having a hollow orificed knob in advance of said head communicating with said bore.

2. The combination with an oil burner having a nozzle provided with a frusto-conical valve seat, and a steam valve within said nozzle having a frusto-conical portion engageable with said seat, of an oil valve within said steam valve having a frusto-conical portion engageable with said steam valve, and having a rounded head projecting in advance of said frusto-conical portion, a supplementary nozzle alining with said first named nozzle, and having a bore shaped to conform to the contour of said oil valve head, said supplementary nozzle having a spherical transversely slotted hollow knob, and having a duct communicating with said mixing chamber and the interior of said knob, and a connecting means joining said supplementary nozzle and the first named nozzle.

In testimony whereof, I affix my signature, in presence of two witnesses.

EMMERSON N. SHAW.

Witnesses:
CLAUDE V. BREGARD,
CLAUDE W. FLOYD.

---

Copies of this patent may be obtained for five cents each, by addressing the "Commissioner of Patents, Washington, D. C."